3,554,776
NOVEL PERYLENETETRACARBOXYLIC
DIIMIDE COMPOSITIONS
Herman Gerson, New York, N.Y., and William Eugene
Bachmann, North Haledon, and Paul B. Woodlock,
Midland Park, N.J., assignors to Allied Chemical Corporation, New York, N.Y., a corporation of New York
No Drawing. Filed Nov. 24, 1967, Ser. No. 685,341
Int. Cl. C08h 17/14
U.S. Cl. 106—288
8 Claims

ABSTRACT OF THE DISCLOSURE

This specification discloses novel pigment compositions comprising solid solutions of two or more 3,4,9,10-perylenetetracarboxylic diimides. The solid solutions extend the range of colors and shades of perylene pigments available and the masstone of coatings prepared from these pigments is deeper and more transparent than that of known pigments.

---

The diimide derivatives of perylenetetracarboxylic acid are a known class of compounds useful as pigments. The compounds can be prepared by reacting a 3,4,9,10-perylenetetracarboxylic acid or its dianhydride with an amine. Methods for the preparation of these diimides are described in German Pat. 386,057 issued May 6, 1919, and in U.S. Pat. 2,543,747 issued Mar. 6, 1951, to Shrader.

We have found that two or more diimides of perylenetetracarboxylic acid can be combined to form solid solutions, or mixed crystals, and that such solutions are valuable as pigments. These diimide solid solutions have properties distinct from those of the components of the solution; in particular, unexpectedly varied colors and excellent stability to light.

The diimides of perylenetetracarboxylic acid which can form solid solutions according to the present invention have the formula

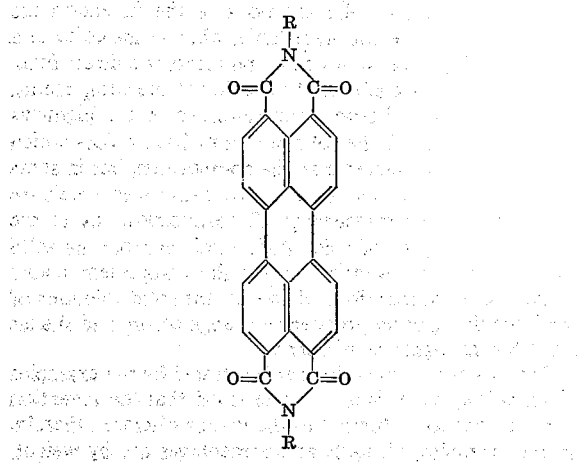

wherein R at each occurrence can be hydrogen, a hydrocarbon radical such as an alkyl, cycloalkyl, aryl, aralkyl, or alkaryl radical; a heterocyclic radical such as a pyridyl or benzothiazolyl; alkoxy and alkoxyaryl radicals, or any of the above substituted with one or mode substituents including halogen, nitro, hydroxy, alkoxy, dialkylamino, and the like. The preferred compounds are those wherein R is hydrogen, an alkyl or an hydroxy-alkyl group wherein the alkyl portion can be a straight or branched carbon chain having from 1 to 8 carbon atoms. Suitable compounds include the following:

3,4,9,10-perylenetetracarboxylic diimide
N,N'-bis(dimethyl)3,4,9,10-perylenetetracarboxylic diimide
N,N'-bis(diethyl)-3,4,9,10-perylenetetracarboxylic diimide
N,N'-bis(n-butyl)-3,4,9,10-perylenetetracarboxylic diimide
N,N'-bis(n-hexyl)-3,4,9,10-perylenetetracarboxylic diimide
N,N'-bis(cyclohexyl)-3,4,9,10-perylenetetracarboxylic diimide
N,N'-bis(dodecyl)-3,4,9,10-perylenetetracarboxylic diimide
N,N'-diethoxy-3,4,9,10-perylenetetracarboxylic diimide
N,N'-diphenyl-3,4,9,10-perylenetetracarboxylic diimide
N,N'-bis(3-methoxyphenyl)-3,4,9,10-perylenetetracarboxylic diimide
N,N'-bis(4-methoxyphenyl)-3,4,9,10-perylenetetracarboxylic diimide
N,N'-bis(4-ethoxyphenyl)-3,4,9,10-perylenetetracarboxylic diimide
N,N'-bis(4-butoxyphenyl)-3,4,9,10-perylenetetracarboxylic diimide
N,N'-dibenzyl-3,4,9,10-perylenetetracarboxylic diimide
N,N'-bis(m-tolyl)-3,4,9,10-perylenetetracarboxylic diimide
N,N'-bis(2,6-dimethylphenyl)-3,4,9,10-perylenetetracarboxylic diimide
N,N'-bis(2,5-dimethylphenyl)-3,4,9,10-perylenetetracarboxylic diimide
N,N'-bis(2,4-dimethylphenyl)-3,4,9,10-perylenetetracarboxylic diimide
N,N'-bis(2-methoxy-4-methylphenyl)-3,4,9,10-perylenetetracarboxylic diimide
N,N'-bis(2-methoxy-5-methylphenyl)-3,4,9,10-perylenetetracarboxylic diimide
N,N'-bis(4-isopropoxyphenyl)-3,4,9,10-perylenetetracarboxylic diimide
N,N'-bis(4-[n-octyloxy]phenyl)-3,4,9,10-perylenetetracarboxylic diimide
N,N'-bis(3-chlorophenyl)-3,4,9,10-perylenetetracarboxylic diimide
N,N'-bis(4-chlorophenyl)-3,4,9,10-perylenetetracarboxylic diimide
N,N'-bis(2-chloro-4-methoxyphenyl)-3,4,9,10-perylenetetracarboxylic diimide
N,N'-bis(4-bromophenyl)-3,4,9,10-perylenetetracarboxylic diimide
N,N'-bis(2-chloro-α,α,α-trifluoro-o-tolyl)-3,4,9,10-perylenetetracarboxylic diimide
N,N'-bis(4-[2,2,2-trifluoro-1-hydroxy-1-(trifluoromethyl)-ethyl]phenyl-3,4,9,10-perylenetetracarboxylic diimide
N,N'-bis(4-pyridyl)-3,4,9,10-perylenetetracarboxylic diimide
N,N'-bis(3-pyridyl)-3,4,9,10-perylenetetracarboxylic diimide
N,N'-bis(2-pyridyl)-3,4,9,10-perylenetetracarboxylic diimide
N,N'-bis(3-methyl-3-pyridyl)-3,4,9,10-perylenetetracarboxylic diimide
N,N'-bis(5-methyl-2-pyridyl)-3,4,9,10-perylenetetracarboxylic diimide
N,N'-bis(4,6-dimethyl-2-pyridyl)-3,4,9,10-perylenetetracarboxylic diimide
N,N'-bis(-2hydroxylethylene)-3,4,9,10-perylenetetracarboxylic diimide N,N'-bis(3-hydroxypropylene)-3,4,9,10-perylenetetracarboxylic diimide
N,N'-bis(4-methylthiophenyl)-3,4,9,10-perylenetetracarboxylic diimide
N,N'-bis(acetamidophenyl)-3,4,9,10-perylenetetracarboxylic diimide
N,N'-bis(2-benzothiazolyl)-3,4,9,10-perylenetetracarboxylic diimide
N,N'-bis(dinaphthyl)-3,4,9,10-perylenetetracarboxylic diimide
N,N'-bis(3-nitrophenyl)-3,4,9,10-perylenetetracarboxylic diimide
N,N'-bis(4-nitrophenyl)-3,4,9,10-perylenetetracarboxylic diimide
N,N'-bis(2,4,6-trichlorophenyl)-3,4,9,10-perylenetetracarboxylic diimide and the like.

Solid solutions are homogeneous compositions wherein the molecules of each component enter into the same crystal lattice, which can be that of one of the components or a crystal lattice which differs from that of either of the components. In any event, a solid solution can be differentiated from a physical mixture of the components by examination of their X-ray diffraction patterns. In a physical mixture the X-ray diffraction patterns characteristic of each of the components are identifiable, and the pattern of the mixture is the sum of the patterns of each of the components. The X-ray diffraction pattern of a solid solution, however, is clearly distinguishable from those of its components; some of the X-ray lines of the components may disappear and new ones appear.

The solid solutions of the invention can be prepared by several methods, some of which are known to those skilled in the art.

A solid solution can be prepared by contacting two or more finely divided diimide derivatives of perylenetetracarboxylic acid with an organic liquid having a high dielectric constant, either at ambient or elevated temperatures, for example at the reflux temperature of the liquid. Suitable liquids for this method include dimethylformamide, pyridine, phenol, trichlorobenzene, dimethylsulfoxide, N-methylpyrrolidone, quinoline and the like. Finely divided diimides of perylenetetracarboxylic acid can be readily obtained either by grinding, salt-milling, or by dissolving in sulfuric or polyphosphoric acid and reprecipitating by drowning in water.

According to the well-known "vatting" method, the desired diimides are dissolved in an aqueous alkaline sodium hydrosulfite solution and the solution treated with an oxidizing agent to reprecipitate the diimides as a solid solution.

According to another known method for preparing solid solutions, two or more of the desired diimides are dissolved in a solvent, employing elevated temperatures and superatmospheric pressures where required. The solvent must be inert to the diimides and can be either an organic solvent such as dimethylformamide, chloroform, trichlorobenzene, quinoline, and the like, or an inorganic solvent such as water, sulfuric acid, or phosphoric acid.

According to the preferred method of preparing the solid solutions of the invention, perylenetetracarboxylic acid or its dianhydride is reacted with two or more of the desired amines in an aqueous solution. The perylenetetracarboxylic acid reactant is dissolved in dilute aqueous caustic solution forming an alkaline salt, and the caustic is neutralized with an acid, thereby precipitating the perylenetetracarboxylic acid in finely divided form and facilitating its reaction with the desired amine. The diimide is formed by heating the reaction mixture at about 130–150° C. at superatmospheric pressures, generally from 30–50 p.s.i., for several hours, usually from about four to twenty-four hours or longer. The solid solutions can be prepared directly from the perylenetetracarboxylic acid either by adding a mixture of amines to a stoichiometric amount of perylenetetracarboxylic acid, or by successive addition of the desired amines.

Although for a particular combination of two or more perylenetetracarboxylic diimides one or another of the above-described methods of preparing a solid solution may be preferred, one skilled in the art can readily determine the optimum method, solvent system, temperature, etc.

The proportions of each diimide in the solid solution can vary over a wide range generally from about 5 percent to about 95 percent by weight. When less than about 5 percent of one component is present, only an insignificant change in properties will be noted. Preferably at least about 20 percent of one diimide component will be present.

The solid solutions of the invention are valuable as pigments and can be used either alone or in admixture with other pigments for coloration purposes, for example in paints, lacquers, enamels, printing inks, and other coating compositions; in plastics such as polystyrene, polyolefins, phenol-formaldehyde resins, polyvinyl chloride, polyacrylic resins, cellulose acetates, polyesters, and polyamides; and in fiber-forming materials such as viscose, cellulose acetates, polyamides, polyesters and the like. The shades obtained from the solid solutions range from dark to light colors in the red portions of the spectrum. They are frequently deeper, clearer, and more transparent than the shades obtained from the component perylenetetracarboxylic diimides used alone or as simple physical mixtures. In some cases the lightfastness of the solid solution is improved over that of the diimide components. For example, the lightfastness of a solid solution of N,N'-bis(4-methoxyphenyl)-3,4,9,10-perylenetetracarboxylic diimide and N,N'-bis(4-ethoxyphenyl)-3,4,9,10-perylenetetracarboxylic diimide is far superior to that of N,N'-bis(4-ethoxyphenyl)-3,4,9,10-perylenetetracarboxylic diimide alone. Thus, lightfast pigments can be prepared according to the invention from known pigments which have insufficient lightfastness for commercial applications. An additional advantage to the use of the solid solutions of the invention over that of a mixture of diimides is that the solid solutions are affected by light in homogeneous manner, whereas a physical mixture of two or more diimides will degrade in an uneven manner, characteristic of the different rates of degradation of the components, with the result that marked color changes occur in the mixture.

The color of the solid solutions of the invention are unexpected and are not predictable, whereas the color of a physical mixture of two or more pigments is a direct function of the additive effects of the color of the components, the colors obtained from solid solutions of the pigments are not. In general, the solid solutions have colors which are brighter and clearer than the components, but in some cases the colors though weaker have masstones which are deeper and more transparent. Generalizations as to the direction or degree of color shift obtained from the solid solutions of the invention versus the component colors cannot be made therefore. However, the solid solutions of the invention greatly broaden the range colors and shades available as lightfast pigments.

The invention can be further illustrated by the examples given below, but it is to be understood that the invention is not meant to be limited to the details disclosed therein. In the examples, all parts and percentages are by weight.

EXAMPLE 1

27 parts of N,N'-dimethyl-3,4,9,10-perylenetetracarboxylic diimide and 3 parts of 3,4,9,10-perylenetetracarboxylic diimide were dissolved in 450 parts of 98% sulfuric acid and stirred for sixteen hours. The solution was drowned into 1000 parts of water. The resultant slurry was filtered, and the product washed with water until acid-free, dried, and micro-pulverized.

The X-ray diffraction spectrum of the solid product exhibited lines corresponding to the following interplanar spacing in angstrom units:

Strong lines: 3.25, 7.48
Medium lines: 3.18, 3.52, 3.74, 3.84, 6.76, 8.03, 11.00
Weak lines: 4.72, 5.02

This is different from the X-ray diffraction spectrum of either of the diimides above or of a physical mixture of the two components as shown by the spectrum lines given below.

N'-dimethyl-3,4,9,10-perylenetetracarboxylic diimide:

Strong lines: 3.42, 7.48
  Medium lines: 3.18, 3.55, 3.75, 6.76, 8.02, 11.00
  Weak lines: 4.72, 5.02

3,4,9,10-perylenetetracarboxylic diimide:

Strong lines: 3.32, 3.60, 7.57
  Medium lines: 2.98
  Weak lines: 4.53, 5.54, 9.03

Mixture of 85 parts of N,N'-dimethyl-3,4,9,10-perylenetetracarboxylic diimide and 15 parts of 3,4,9,10-perylenetetrarboxylic diimide:

Strong lines: 3.25, 7.48
Medium lines: 3.18, 3.52, 3.76, 6.76, 8.03, 11.00
Weak lines: 4.72, 5.02

It is apparent that the novel pigment of the invention exhibits unique spectrum lines at 3.74 and 3.84 angstroms.

The pigment was tested for masstone according to ASTM test D38–52T procedure B and compared to N,N'-dimethyl-3,4,9,10-perylenetetracarbonic diimide and also to a physical mixture in a weight proportion of 90:10 of the dimethyl-substituted diimide and 3,4,9,10-perylenetetracarboxylic diimide. The pigment of the invention was deeper, more transparent and had a yellower undertone than the dimethyl-substituted compound and was deeper, stronger in color strength, and less blue in undertone than the mixed pigment.

EXAMPLES 2–9

The procedure of Example 1 was followed but varying the proportions of N,N'-dimethyl-3,4,9,10-perylenetetracarboxylic diimide and 3,4,9,10-perylenetetracarboxylic diimide. The masstones of the resultant solid solutions were determined as in Example 1 and compared to N,N'-dimethyl-3,4,9,10-perylenetetracarboxylic diimide as a standard. This pigment has a deep masstone and a yellowish red undertone whereas the unsubstituted diimide has a dull masstone and violet undertone. The results are given below:

| Example | Percent 3, 4, 9, 10 perylene- tetra- carboxylic diimide | Masstone | Shade |
| --- | --- | --- | --- |
| 2 | 2 | Slightly deeper, stronger and clearer. | Slightly yellow. |
| 3 | 4 | ---do--- | Do. |
| 4 | 6 | ---do--- | Do. |
| 5 | 10 | Much deeper, stronger, and clearer. | Yellow. |
| 6 | 15 | ---do--- | Do. |
| 7 | 20 | ---do--- | Do. |
| 8 | 25 | Dirtier, bluer | Dirty blue. |
| 9 | 50 | Dirtier, much bluer | Do. |

The pigments as prepared in Example 5, 6, and 7 were added to standard automobile enamels, sprayed onto steel panels, and exposed to sunlight as in Example 1. The lightfastness after one year was excellent.

The X-ray diffraction data of the pigments as prepared in Examples 2 to 9 were compared to those of the component diimides. The spectra were characteristic of solid solutions rather than either of the component diimides alone.

EXAMPLE 10

10 parts of N,N'-bis(4-ethoxyphenyl)-3,4,9,10 - perylenetetracarboxylic diimide and 10 parts of N,N'-bis(4-methoxyphenyl)-3,4,9,10 - perylenetetracarboxylic diimide were added to a solution containing 20 parts of potassium hydroxide in 1500 parts of water and stirred at 45–50° C. for several minutes. 35 parts of sodium hydrosulfite were added slowly, and the mixture was stirred for thirty minutes. The mixture was drowned in 1000 parts of water containing 50 parts of m-nitrobenzene sodium sulfonate and the mixture stirred for one hour. The resultant solid product was filtered and washed well with water to remove water soluble materials.

The X-ray diffraction spectrum of the product exhibited lines corresponding to the following interplanar spacings in angstrom units:

Strong lines: 3.20, 4.00, 7.20, 19.20
Medium lines: 3.60
Weak lines: 3.07, 4.58, 5.70, 9.41

This spectrum is different from that of either of the component diimides, as shown by the data given below.

N,N'-bis(4-ethoxyphenyl)-3,4,9,10 - perylenetetracarboxylic diimide:

Strong lines: 3.26, 4.30, 6.52
  Medium lines: 3.53, 3.87, 16.39
  Weak lines: 2.98, 3.14, 3.74, 4.88

N,N'-bis(4 - methoxyphenyl)-3,4,9,10 - perylenetetracarboxylic diimide:

Strong lines: 3.28, 3.57, 3.88, 6.55, 9.31, 15.25
  Medium lines: 3.45, 3.74, 4.77, 10.92
  Weak lines: 2.85, 2.92, 5.34

The solid solution pigment as prepared above was added to a standard automobile enamel composition and sprayed on steel panels. The shade was much yellower than a similarly prepared panel containing N,N'-bis(4-methoxyphenyl)-3,4,9,10 - perylenetetracarboxylic diimide as pigment. The panels were exposed to Florida sunshine for one year. Their stability to light was equal.

EXAMPLE 11

30.4 parts of perylenetetracarboxylic dianhydride were dissolved in a solution containing 15.5 parts of potassium hydroxide in 500 parts of water heated to 85° C. The solution was cooled to 50° C. and poured into a mixture containing 27.6 parts of 80% acetic acid, 6 parts of a 40% solution of methylamine, and 100 parts of water. The resultant slurry was heated in a pressure kettle at 140–145° C. under 40 p.s.i. pressure for over eight hours. The mixture was cooled to below 60° C., and 15.5 parts of 90% potassium hydroxide flakes were stirred in. A solution of 9.6 parts of p-anisidine in 27.6 parts of 80% acetic acid and 50 parts of water was added and the resultant reaction mixture heated at 140–145° C. (as above) for five hours. The resultant slurry was cooled, filtered, and the solid product washed and dried.

The solid product was tested for masstone as in Example 1 and compared to N,N'-bis(4-methoxyphenyl)-3,4,9,10-perylenetetracarboxylic diimide and to a mixture containing equal portions of N,N'-bis(4-methoxyphenyl)-3,4,9,10 - perylenetetracarboxylic diimide and N,N'-dimethyl-3,4,9,10-perylenetetracarboxylic diimide. The solid solution as prepared above was very much deeper in masstone than the other pigments.

EXAMPLE 12

291.4 parts of perylenetetracarboxylic dianhydride were dissolved in a solution containing 148.8 parts of potassium hydroxide in 4800 parts of water heated to 90° C. The solution was added to a mixture containing 265 parts of 80% acetic acid, 91.7 parts of p-anisidine, and 1000 parts of water. The resultant slurry was heated at 140–145° C.

for five hours in a pressure kettle at about 40 p.s.i. pressure, cooled to about 90° C., and a solution containing 149 parts of potassium hydroxide in 240 parts of water added. A solution containing 265.2 parts of 80% acetic acid, 103.2 parts of p-phenetidine, and 500 parts of water was charged to the pressure kettle. The reaction mixture was heated at 140–145° C. for five hours at about 40 p.s.i. pressure and then cooled to 90° C.

The resultant solid product was filtered, washed, and dried.

The X-ray diffraction spectra of the resultant product was identical to the product prepared as in Example 10. Thus, according to the present invention a new and highly desirable class of pigments has been provided which can be prepared by various simple procedures that greatly enlarge the shades and colors of lightfast pigments available.

It will be apparent that numerous modifications and variations can be effected without departing from the novel concepts of the present invention, and the illustrative details disclosed herein are not to be construed as imposing undue limitations on the invention.

We claim:
1. A composition of matter consisting essentially of a solid solution of at least two components, each component being present in amount of at least 5% by weight, having the formula

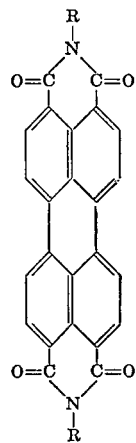

wherein R at each occurrence is selected from the group consisting of hydrogen, a hydrocarbon radical, a heterocyclic radical, alkoxy and alkoxyaryl radicals, said hydrocarbon, alkoxy, and alkoxyaryl radicals having from 1 to 8 carbon atoms, and said radicals substituted with one or more substituents selected from the group consisting of halogen, nitro, hydroxy, alkoxy, and dialkylamine.

2. A composition according to claim 1 wherein R is an alkyl radical having from 1 to 8 carbon atoms.

3. A composition according to claim 1 wherein R is an alkoxyaryl radical having from 1 to 8 carbon atoms.

4. A composition according to claim 1 consisting essentially of from 5 to 95% by weight of 3,4,9,10-perylenetetracarboxylic acid diimide and from 95 to 5% by weight of an N,N'-dialkyl-3,4,9,10-perylenetetracarboxylic acid diimide wherein the alkyl groups contain from 1 to 8 carbon atoms.

5. A composition according to claim 1 consisting essentially of from 5 to 95% by weight of an N,N'-dialkyl-3,4,8,9-perylenetetracarboxylic acid diimide and from 95 to 5% by weight of an N,N'-alkoxyaryl-3,4,9,10-perylenetetracarboxylic acid diimide wherein the alkyl groups and the alkoxyaryl groups contain from 1 to 8 carbon atoms.

6. A composition according to claim 4 consisting essentially of from 5 to 95 percent by weight of N,N'-dimethyl-3,4,9,10-perylenetetracarboxylic diimide and from 95 to 5 percent by weight of 3,4,9,10-perylenetetracarboxylic diimide.

7. A composition according to claim 3 consisting essentially of from 5 to 95 percent by weight of N,N'-bis(4-ethoxyphenyl) - 3,4,9,10 - perylenetetracarboxylic diimide and from 95 to 5 percent by weight of N,N'-bis(4-methoxyphenyl)-3,4,9,10-perylenetetracarboxylic diimide.

8. A composition according to claim 5 consisting essentially of from 5 to 95 percent by weight of N,N'-dimethyl-3,4,9,10-perylenetetracarboxylic diimide and from 95 to 5 percent of N,N'-bis(4-methoxyphenyl)-3,4,9,10-perylenetetracarboxylic diimide.

References Cited
UNITED STATES PATENTS

| | | | |
|---|---|---|---|
| 2,890,220 | 6/1959 | Eckert et al. | 106—288-O |
| 3,043,843 | 7/1962 | Koch | 106—288-O |
| 3,331,847 | 7/1967 | Gerson et al. | 106—288-O |
| 3,357,983 | 12/1967 | Weener et al. | 106—288-O |

JAMES E. POER, Primary Examiner